United States Patent
Polland et al.

(10) Patent No.: US 8,358,584 B2
(45) Date of Patent: Jan. 22, 2013

(54) PORT FAILURE COMMUNICATION IN CROSS-CONNECT APPLICATIONS

(75) Inventors: Joe Polland, Eden Prairie, MN (US); Fu-Chin Yang, Beijing (CN); Manish Sharma, Eden Prairie, MN (US); Xinkuan Zhou, Eden Prairie, MN (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 436 days.

(21) Appl. No.: 11/947,457

(22) Filed: Nov. 29, 2007

(65) Prior Publication Data

US 2009/0141640 A1    Jun. 4, 2009

(51) Int. Cl.
*G01R 31/08* (2006.01)

(52) U.S. Cl. ........................................ 370/242
(58) Field of Classification Search ............... 370/242, 370/216
See application file for complete search history.

(56) References Cited

U.S. PATENT DOCUMENTS

| | | | | |
|---|---|---|---|---|
| 4,759,009 | A * | 7/1988 | Casady et al. | 370/221 |
| 5,265,096 | A | 11/1993 | Parruck | |
| 5,479,608 | A * | 12/1995 | Richardson | 714/4 |
| 5,946,373 | A | 8/1999 | Harris | |
| 6,005,694 | A * | 12/1999 | Liu | 398/6 |
| 6,112,232 | A * | 8/2000 | Shahar et al. | 709/217 |
| 7,100,092 | B2 * | 8/2006 | Allred et al. | 714/43 |
| 7,512,121 | B1 * | 3/2009 | Morgan et al. | 370/358 |
| 2001/0046207 | A1 * | 11/2001 | Isonuma et al. | 370/223 |
| 2002/0136397 | A1 * | 9/2002 | Zeng et al. | 379/417 |
| 2003/0039207 | A1 * | 2/2003 | Maeda et al. | 370/216 |
| 2004/0170128 | A1 * | 9/2004 | Takamichi | 370/245 |
| 2005/0086555 | A1 * | 4/2005 | Langridge | 714/4 |
| 2005/0220031 | A1 * | 10/2005 | Barton et al. | 370/242 |

FOREIGN PATENT DOCUMENTS

| | | |
|---|---|---|
| EP | 1585271 | 10/2005 |
| WO | 02054821 | 7/2002 |

OTHER PUBLICATIONS

International Searching Authority, "International Search Report", Jun. 26, 2009, Published in: WO.
Chilean Patent Office, "Examiner's Report", Dated Aug. 2010, Published in: CL.
Chile Patent Office, "First Office Action", Apr. 4, 2010, Published in: CL.

* cited by examiner

*Primary Examiner* — Mark Rinehart
*Assistant Examiner* — Angel Brockman
(74) *Attorney, Agent, or Firm* — Fogg & Powers LLC

(57) ABSTRACT

Systems and methods for communicating faults across a communications network cross-connect are provided. In one embodiment, a method for communicating an alarm condition in a cross-connected network is provided. The method comprises providing a cross-connect having a first side and a second side, wherein the first side includes a plurality of interface ports and the second side includes an interface port; detecting a fault on a first interface port of the first side; and when a fault is detected on the first interface port of the first side, transmitting a signal on the interface port of the second side, the signal having a pre-defined alarm data pattern inserted into one or more time slots associated with the first interface port of the first side.

24 Claims, 4 Drawing Sheets

US 8,358,584 B2

PORT FAILURE COMMUNICATION IN CROSS-CONNECT APPLICATIONS

BACKGROUND

In communications networks, data is often transported on communications links using a variety of communications protocols. Often there arises a need to gather data acquired from nodes via different communications links using different protocols, and share that data over a common communications links using another protocol. To address this need, devices that enable cross-connection (also referred to as cross-link) between differing protocols has been developed. Examples of such devices include the WorldDSL model WD92xGN and WD92xGL G.SHDSL line units from ADC, which in one configuration when configured as a cross-connection, enable data received from G.703, Nx64k, and Ethernet protocol interfaces on one side of the cross-connection to be communicated on a G.703 protocol interface on the other side of the cross-connection. In another configuration, such devices can be configured to enable data received from a G.703 protocol interface on one side of the cross-connection to be communicated via G.703, Nx64k, and Ethernet protocol interfaces on the other side.

One standard method of flagging that a fault condition exists on an interface port is with an alarm indication signal (AIS). One problem that arises in the use of such cross-connections concerns the communication of fault conditions affecting one side of the cross-connection to network equipment connected to the other side of the cross-connection without interfering with data communications from any non-faulted ports. For example, in the above mentioned configuration where data received from G.703, Nx64k, and Ethernet protocol interfaces on the first side of a cross-connection are communicated on a G.703 protocol interface on the second side of the cross-connection, if a fault is detected on the Nx64K port on the first side, initiating an AIS signal on the G.703 port on the second side would interfere with the continued transport of data received on the non-faulted G.703 and Ethernet first side ports via the G.703 second side port.

For the reasons stated above and for other reasons stated below which will become apparent to those skilled in the art upon reading and understanding the present specification, there is a need in the art for improved systems and methods for communicating faults across a communications network cross-connect.

SUMMARY

The Embodiments of the present invention provide methods and systems for communicating faults across a communications network cross-connect and will be understood by reading and studying the following specification.

In one embodiment, a method for communicating an alarm condition in a cross-connected network is provided. The method comprises providing a cross-connect having a first side and a second side, wherein the first side includes plurality of interface ports and the second side includes an interface ports; and detecting a fault on a first interface port of the first side. When a fault is detected on the first interface port of the first side, a signal is transmitted on the interface port of the second side, the signal having a pre-defined alarm data pattern inserted into one or more time slots associated with the first interface port of the first side.

In another embodiment, a communication network system is provided. The system comprises a cross-connect adapted with a first side having a plurality of interface ports and a second side having an interface port. The cross-connect is adapted to communicate data between the plurality of interface ports on the first side and the interface port on the second side. The cross-connect is further adapted to detect when a fault occurs on at least one of the plurality of interface ports of the first side and the interface port of the second side. When the cross-connect detects a fault on a first interface port of the first side, the cross-connect is adapted to transmit a signal having a pre-defined data pattern inserted into one or more time slots associated with the first interface port of the first side from the interface port of the second side.

In still another embodiment, a system for communicating an alarm condition in a cross-connected network is provided. The system comprises means for communicating data, the means for communicating data having a first side and a second side, wherein the first side includes a plurality of interface ports and the second side includes an interface port. The system further comprises means for detecting a fault on a first interface port of the first side, the means for detecting responsive to the means for communicating data. The system further comprises means for transmitting an alarm signal on the interface port of the second side when a fault is detected on the first interface port of the first side, the alarm signal having a pre-defined alarm data pattern inserted into one or more time slots associated with the first interface port of the first side, the means for transmitting responsive to the means for detecting.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings, which form a part hereof, and in which is shown by way of illustrating specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Figure 1:
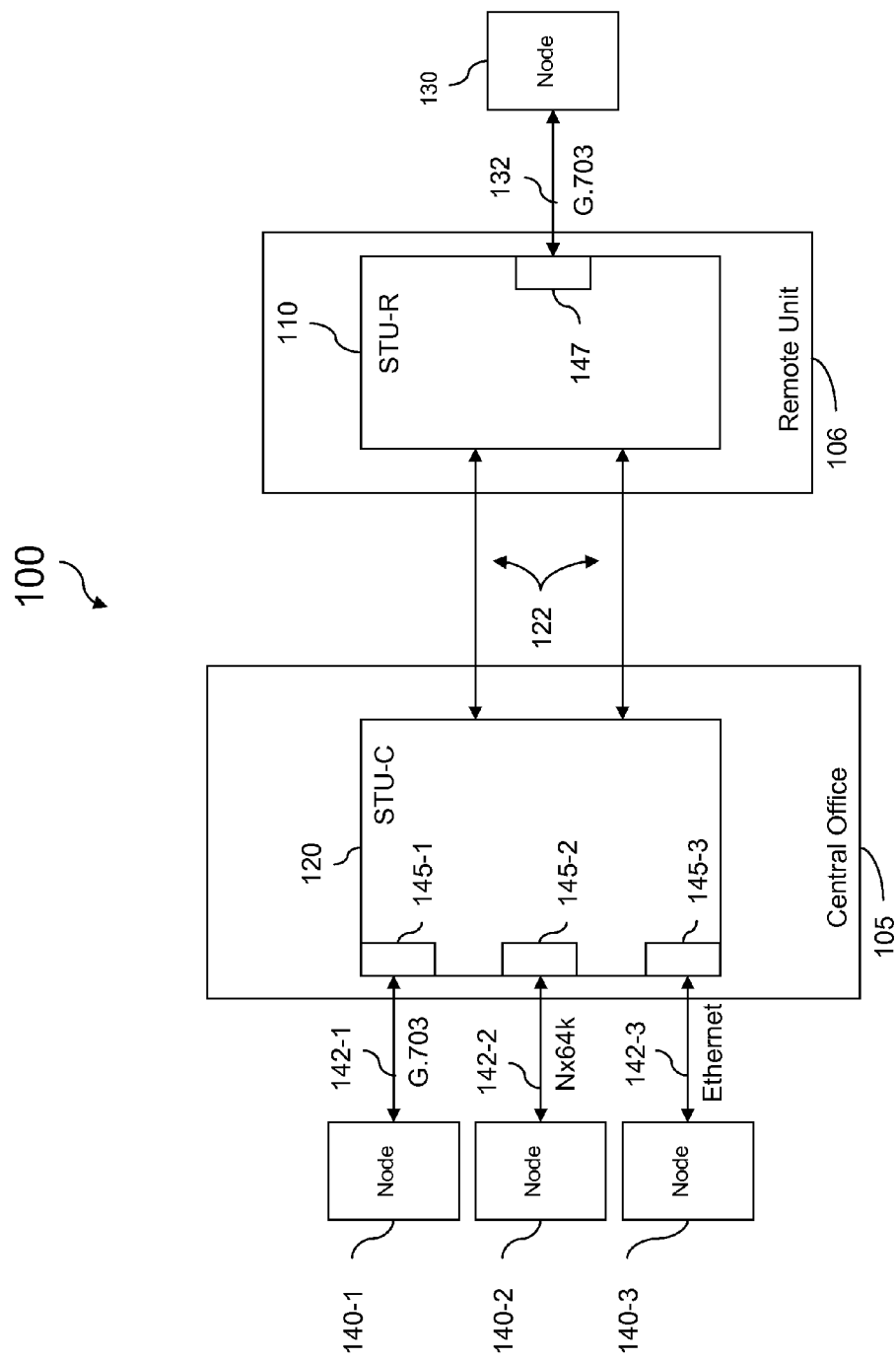
FIG. 1 is a block diagram illustrating a network of one embodiment of the present invention.

FIG. 1 shows an embodiment of a communications network 100 of one embodiment of the present invention. The network 100 includes a central office 105 in communication with at least one remote unit 106. The central office 105 includes a transceiver unit (STU-C) 120 that is coupled to communicate with a transceiver unit (STU-R) 110 located at the remote unit 106. In one embodiment, STU-C comprises a G.SHDSL line unit. In one embodiment, STU-R comprises a G.SHDSL line unit. Although FIG. 1 illustrates only a single remote unit 106 coupled to central office 105, one skilled in the art will appreciate that the scope of the present invention also includes embodiments with multiple remote transceivers units (STU-R's) located at multiple remote sites all coupled to communicate with STU-C 120.

In the embodiment shown in FIG. 1, the STU-C 120 communicates with the STU-R 110 through a communication link (shown generally at 122). In FIG. 1, communication link 122 is implemented as a double G.SHDSL loop. In an alternate embodiment, STU-C 120 communicates with STU-R 110 through a single G.SHDSL loop communication link 122. Data received from STU-C 120 by STU-R 110 is referred to as data flowing in the downstream direction. Data received from STU-R 110 by STU-C 120 is referred to as data flowing in the upstream direction.

In the embodiment shown in FIG. 1, STU-C 120 is coupled in the upstream direction to network nodes (referred to herein as "nodes") 140-1 to 140-3 through communication links 142-1 to 142-3. In one embodiment, nodes 140-1 to 140-3 comprise data terminal equipment (DTE). In other embodiments, STU-C is coupled to a greater or lesser number of nodes through a greater or lesser number of communication links The STU-C 120 communicates with the nodes 140-1 to 140-3 using various different data protocols such as but not limited to G.703, Nx64k, and Ethernet. STU-C 120 includes all functionality required to receive downstream data (sometimes referred to as data payloads) from each of the nodes 140-1 to 140-3 and format the data for downstream transmission to the STU-R 110. STU-C 120 also includes all the functionality required to receive upstream data from the STU-R 110 and format the data for transmission to nodes 140-1 to 140-3.

In the embodiment shown in FIG. 1, STU-R 110 is coupled in the downstream direction to node 130 through communication link 132. In one embodiment, node 130 comprises data terminal equipment (DTE). In other embodiments, STU-R is coupled to additional downstream nodes through additional communication links. The STU-R 130 communicates with the node 130 using one of a variety of different data protocols such as but not limited to G.703, Nx64k, and Ethernet. In the particular embodiment shown in FIG. 1, STU-R 110 communicates with node 130 by implementing a G.703 protocol over communication link 132. STU-R 110 includes all functionality required to receive upstream data payloads from node 130 and format the data payloads for upstream transmission to the STU-C 120. STU-R 120 also includes all the functionality required to receive downstream data from the STU-C 120 and format the data for transmission to node 130 via communication link 132.

Nodes 140-1 to 140-3 and node 130 can include any communication equipment or device needs to communicate data with other nodes of network 100. In various embodiments, the nodes may include local area networks, data terminal equipment or other systems and devices.

In the embodiment in FIG. 1, STU-C 120 and STU-R 110 together implement a cross-connect feature (also referred to as a cross-connect, a cross-connection, or a cross-link) that allows multiple ports using different protocols on one side to communicate via a single port, implementing a single protocol at the other side. The particular embodiment illustrated in FIG. 1 illustrates a "3 to 1" cross-connect that enables three nodes 140-1 to 140-3 coupled to central office 105, each utilizing a different protocol, to communicate with a node 130 downstream of STU-R 110 utilizing a single protocol. STU-C 120 includes a G.703 port interface 145-1 for communicating with node140-1 using the G.703 protocol over communication link 142-1. STU-C 120 also includes a Nx64k port interface 145-2 for communicating with node140-2 using the Nx64k protocol over communication link 142-2, and further includes an Ethernet port interface 145-3 for communicating with node140-3 using an Ethernet protocol over communication link 142-3. STU-R 110 includes a G.703 port interface 147 for communicating with node 130 using the G.703 protocol over communication link 132. In the particular embodiment shown in FIG. 1, G.703 port interface 145-1, Nx64k port interface 145-2 and Ethernet port interface 142-3 of STU-C 120 are cross-connected to G.703 port interface 132. In other embodiments, other protocol combinations are used.

In operation, data payloads received by STU-C 120 via G.703 port interface 145-1, Nx64k port interface 145-2, and Ethernet port interface 145-3 are transmitted downstream to node 130 by STU-R 110 via G.703 port interface 132. Cross-connection is achieved by allocating timeslots on the communication link 122 between STU-C 120 and STU-R 110, and communication link 132 between STU-R 110 and node 130, for data transmitted via each of G.703 port interface 142-1, Nx64k port interface 142-2, and Ethernet port interface 142-3. In one embodiment, in operation, STU-C 120 receives downstream payload data from each of the nodes 140-1 to 140-3 and STU-C 120 communicates the downstream payload data to STU-R 120 by transmitting data from each respective payload to STU-R 110 during a timeslot assigned to each port on communication link 122. For example, in one implementation of network 100, data received from the G.703 port interface 145-1 is transmitted during a first timeslot, data received from the Nx64k port interface 145-2 is transmitted during a second timeslot, and data received from the Ethernet data port interface 145-3 is transmitted during a third timeslot. STU-R 110 receives the multiplexed data on communication link 122. STU-R 110 similarly transmits the data associated with each of the G.703 port interface 145-1, Nx64k port interface 145-2, and Ethernet data port interface 145-3 during a respective timeslot assigned to each port via G.703 port interface 147. One of ordinary skill in the art upon reading this specification would appreciate that the duration of each timeslot, and thus the amount of data each time slot can carry, can vary from application to application. In alternate embodiments, a time slot associated with one port can be longer or shorter than a time slot associated with another port. Further, one port can be allocated a greater, or lesser, number of timeslots than another port.

Cross-connection in the upstream direction is achieved by associating timeslots on communications link 132 to specific interface ports 145-1 to 145-3. In operation, STU-R 110 receives upstream payload data from node 130 via communication link 132. The upstream payload data is communicated by STU-C 120 to one of G.703 port interface 145-1, Nx64 port interface 145-2, and Ethernet port interface 145-3 based on the timeslot the payload data occupied. For example, in one implementation of network 100, upstream data received by STU-C 120 during the first timeslot is transmitted to the G.703 port interface145-1, upstream data received during the second timeslot is transmitted to the Nx64k port interface145-2, and the upstream data received during the third timeslot is transmitted to Ethernet port interface142-3. One of ordinary skill in the art upon reading this specification would appreciate that the duration of each timeslot, and thus the amount of data each time slot can carry, can vary from application to application. In alternate embodiments, a time slot associated with one port can be longer or shorter than a time slot associated with another port. Further, one port can be allocated a greater, or lesser, number of timeslots than another port.

As previously discussed, an Alarm Indication Signal (AIS) is a standard signal used on numerous interface types to indicate an alarm. Embodiments of the present invention provide systems and methods for communicating an AIS signal, as well as other detected port failures, on a communications network using a cross-connect such as that described with respect to FIG. 1. When a fault is detected at a particular port interface, embodiments of the present invention insert into the timeslots associated with that port interface a data pattern associated with the AIS signal for that particular port's protocol. For example, the AIS signal for a G.703 interface is defined by standards as a continuous unframed all binary one's pattern. Therefore, in network 100, when a fault is detected on G.703 port interface 145-1, STU-C 120 and STU-R 110 respond by inserting a continuous all binary one's pattern in the appropriate timeslots allocated to the G.703 port interface 145-1 on communications links 122 and 132. The all binary one's pattern remains framed in this case for transmission on communications links 122 and 132, but the appropriate timeslots are filled by the all binary one's pattern. Any data from un-faulted ports is unaffected and continues to be communicated to node 130 during their associated timeslots. Similarly, when a fault is detected on Nx64 port interface 145-2, STU-R 110 responds by transmitting an AIS pattern in the appropriate timeslots allocated to the Nx64 port interface 145-2. In one embodiment, when a faulted port returns to normal operation (for example, a bit error rate on a particular port interface returns to a specified limit, or an alarm condition ceases to exist) embodiments of the present invention will discontinue generating the AIS for that particular port's protocol, and resume communicating valid data received from the port.

One skilled in the art upon reading this specification would appreciate that there are a number of ways to determine whether a particular port is faulted. Examples include, but are not limited to, detecting a high bit error rate, detecting an anomalous signal power level, detecting a loss of signal, and detecting a loss of frame. A faulted port can also be detected by receiving an AIS signal on that port from an external source such as the node coupled to the other end of the communications link.

In one implementation of network 100, when all incoming data ports interfaced with STU-C 120 have an alarm condition, STU-R 110 responds by transmitting onto communication link 130 a data pattern associated with the AIS signal for that particular port's protocol. For example, when G.703 interface port 145-1, Nx64k interface port 145-2, and Ethernet interface port 145-3 all have fault conditions, STU-R 110 responds by transmitting an unframed all binary ones pattern from G.703 interface port 147. When the alarm condition is removed on any of the data ports 145-1 through 145-3, even if other ports continue in a faulted condition, the AIS transmitted on communication link 130 from the STU-R 210 is removed, and the appropriate framed data pattern is inserted into the timeslots of the still faulted ports. This allows communication of data received from the now un-faulted port to resume with node 130.

In another implementation of network 100, when a fault condition is detected affecting upstream data received on STU-R 110's G.703 interface port 147, STU-C 110 responds by transmitting an appropriate AIS to those upstream nodes implementing protocols that support an AIS. For example, STU-R 110's G.703 interface port 147 expects to receive a clean G.703 framed signal on communications link 132. When a fault is detected on G.703 interface port 147, STU-R 110's has no reliable data to communicate with STU-C 120 via communication link 122. In one embodiment, STU-R 110 responds to such circumstances by communicating and unframed G.703 AIS signal onto communications link 122. Similarly, STU-C 120 expects to receive a clean framed data signal on communications link 122 from STU-R 110. When STU-C 120 fails to receive a clean framed data signal on communications link 122, it responds by transmitting an AIS signal on interface ports 145-1 to 145-3 as supported. In one embodiment, STU-C 110 transmits a G.703 compliant AIS to node 140-1 and a Nx64 compliant AIS to node 140-2. In one embodiment, because the current Ethernet protocol does not support AIS, no AIS is transmitted to node 140-3. In alternate embodiments, for port interfaces that do not support an AIS, the STU-C 120 can be programmed to transmit a signal indicating an alarm situation by other means.

Figure 2:
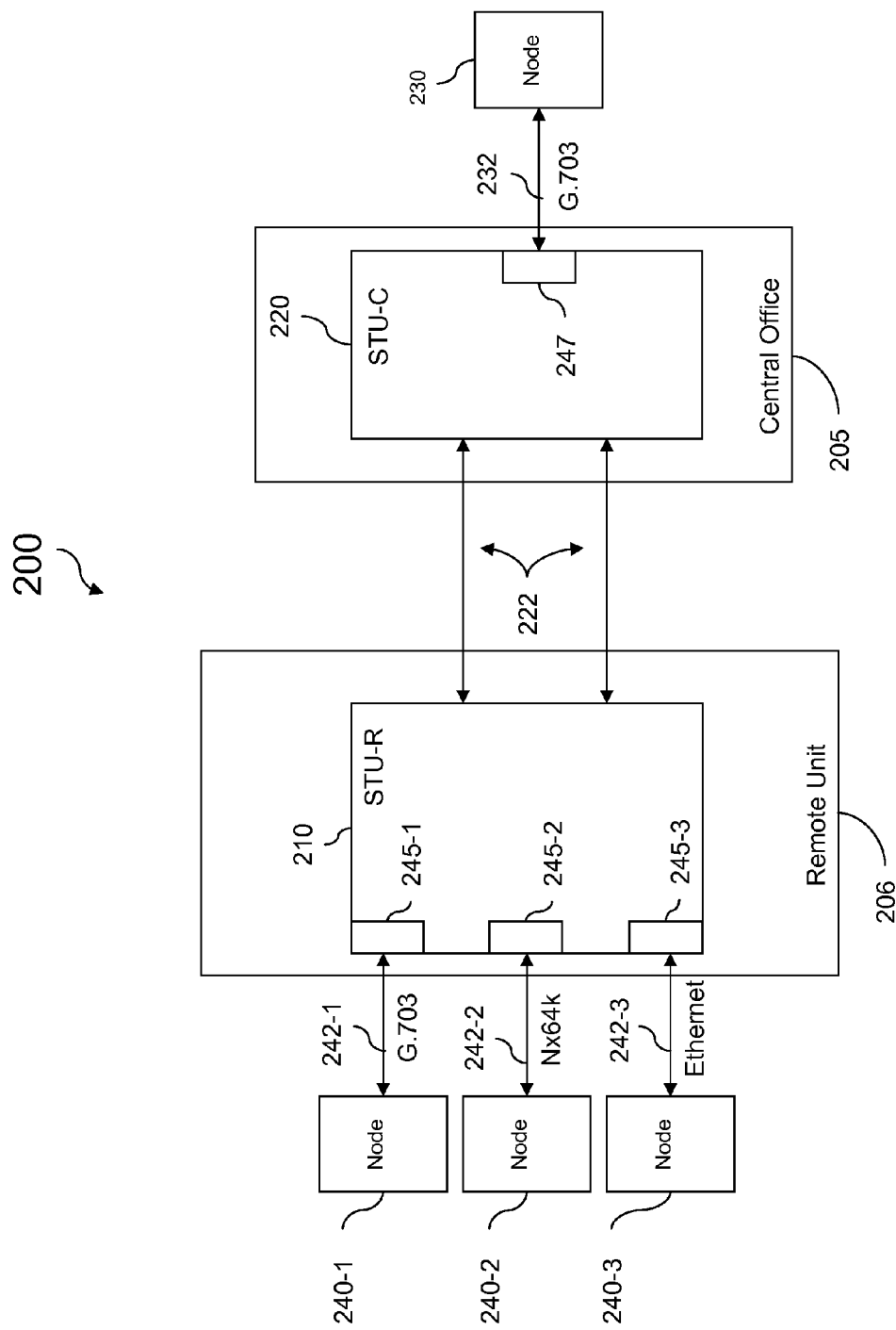
FIG. 2 is a block diagram illustrating another network of one embodiment of the present invention.

FIG. 2 illustrates an alternate embodiment of a communication network 200 having an STU-C 220 located at a central office 205 coupled to communicate with a transceiver unit (STU-R) 210 located at a remote unit 206. Although FIG. 2 illustrates only a single remote unit 206 coupled to central office 205, one skilled in the art will appreciate that the scope of the present invention also includes embodiments with multiple remote transceivers units located at multiple remote sites all coupled to communicate with STU-C 220.

In the embodiment shown in FIG. 2, the STU-C 220 communicates with the STU-R 210 through a communication link (shown generally at 222) implemented as a double G.SHDSL loop. In alternate embodiments, STU-C 220 communicates with the STU-R 210 through a single G.SHDSL loop communication link.

STU-R 210 is coupled in the downstream direction to nodes 240-1 to 240-3 through communication links 242-1 to 242-3. In one embodiment, nodes 240-1 to 240-3 comprise data terminal equipment (DTE). In other embodiments, STU-R 210 is coupled to a greater or lesser number of nodes through a greater or lesser number of communication links. The STU-R 210 communicates with the nodes 240-1 to 240-3 using various different data protocols such as but not limited to G.703, Nx64k, and Ethernet. STU-R 210 includes all functionality required to receive data from each of the nodes 240-1 to 240-3 and format the data for upstream transmission to the STU-C 220. STU-R 210 also includes all the functionality required to receive data from the STU-R 210 and format the data for downstream transmission to nodes 240-1 to 240-3.

In the embodiment shown in FIG. 2, STU-C 220 is coupled in the upstream direction to node 230 through communication link 232. In one embodiment, node 230 comprises data terminal equipment (DTE). In other embodiments, STU-C 220 is coupled to additional downstream nodes through additional communication links. The STU-C 220 communicates with the node 230 using one of a variety of different data protocols such as but not limited to G.703, Nx64k, and Ethernet. In the particular embodiment shown in FIG. 2, STU-C 220 communicates with node 230 by implementing a G.703 protocol over communication link 232. STU-C 220 includes all functionality required to receive data from node 130 and format the data for downstream transmission to the STU-R 210. STU-C 220 also includes all the functionality required to receive data from the STU-R 210 and format the data for upstream transmission to node 230 via communication link 232.

In operation, STU-C 220 and STU-R 210 implement a cross-connect in both the upstream and downstream directions and operate as described with respect to STU-C 120 and STU-R 110 of FIG. 1. In the embodiment of network 200, when a fault is detected at a particular interface port coupled to STU-R 210, a data pattern associated with the AIS signal for that particular port's protocol is inserted into the upstream data transmitted by STU-C 220, in timeslots associated with the faulted port interface. For example, when a fault is detected on G.703 port interface 245-1, STU-C responds by transmitting a framed AIS pattern in the appropriate timeslots of communications link 232 allocated to the G.703 port interface 245-1. Any data from un-faulted ports is unaffected and continues to be communicated to node 230 during their associated timeslots. Similarly, when a fault is detected on Nx64 port interface 245-2, STU-C 210 responds by transmitting a framed AIS pattern in the appropriate timeslots allocated to the Nx64 port interface 245-2. In one embodiment, when a faulted port returns to normal operation (for example, a bit error rate on a particular port interface returns to a specified limit, or an alarm condition ceases to exist) embodiments of the present invention will discontinue generating the framed AIS for that particular port's protocol, and resume communicating valid data received from the port.

In one implementation of network 200, when a fault is detected on each of interface ports 245-1 to 245-3 STU-R 210 responds by transmitting onto communication link 222 a data pattern associated with the AIS signal for interface port 247. For example, when G.703 interface port 245-1, Nx64k interface port 245-2, and Ethernet interface port 245-3 all have fault conditions, STU-C 210 responds by transmitting an AIS having an unframed pattern of all binary ones from G.703 interface port 247 to node 230. When the alarm condition is removed on any of the data ports 245-1 through 245-3, even if other ports continue in a faulted condition, the unframed AIS transmitted on communication link 222 from the STU-C 220 is removed, the appropriate framed AIS patterned data is inserted into the timeslots of the still faulted ports, and communication of data received from the now un-faulted port is resumed to node 230.

In another implementation of network 200, when a fault condition is detected affecting downstream data received on STU-C 220's G.703 interface port 247, STU-R 210 responds by transmitting an appropriate AIS to those downstream nodes implementing protocols that support an AIS. For example, STU-C 220's G.703 interface port 247 expects to receive a clean G.703 framed signal on communications link 232. When a fault is detected on G.703 interface port 247, STU-C 220's has no reliable data to communicate with STU-R 210 via communication link 222. In one embodiment, STU-C 220 responds to such circumstances by communicating and unframed G.703 AIS signal onto communications link 222. Similarly, STU-R 210 expects to receive a clean framed data signal on communications link 222 from STU-C 220. When STU-R 210 fails to receive a clean framed data signal on communications link 222, it responds by transmitting an AIS signal on interface ports 245-1 to 245-3 as supported. In one embodiment, STU-R 220 transmits a G.703 compliant AIS to node 240-1 and a Nx64 compliant AIS to node 240-2. In one embodiment, because the current Ethernet protocol does not support AIS, no AIS is transmitted to node 240-3. In alternate embodiments, for port interfaces that do not support an AIS, the STU-R 210 can be programmed to transmit a signal indicating an alarm situation by other means.

Figure 3:
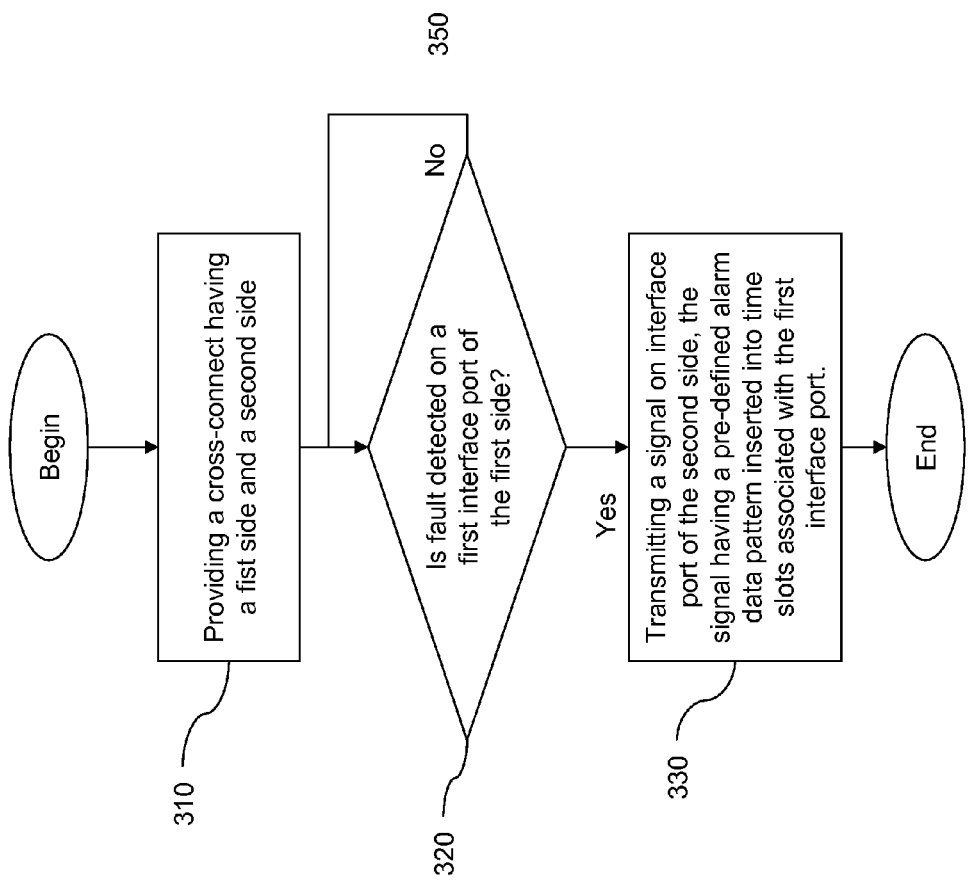
FIG. 3 is a flow chart illustrating a method of one embodiment of the present invention.

FIG. 3 is a flow chart illustrating a method of one embodiment of the present invention. The method begins at 310 with providing a network with a cross-connect having a first side and a second side, wherein the first side includes a plurality of interface ports and the second side includes a second side interface port. One example of such a network is illustrated by network 100 of FIG. 1. In such a network, the cross-connect comprises STU-C 120 coupled to STU-R 110. The first side of the cross-connect comprises interface ports 145-1 through 145-3, which are connected to communicate with upstream nodes 140-1 to 140-3 via communications links 142-1 to 142-3. The second side comprises interface port 147, which is connected to communicate with downstream node 130 via communications link 132. In the downstream direction, the cross-connect receives data packets on interface ports of the first side, and transmits data from those packets to via the interface port of the second side. This is accomplished by assigning by associating one or more time slots on the interface port of the second side with a respective interface port of the first side. For example, in the downstream direction, data received from a first interface port of the first side is transmitted by the interface port of the second side only during a time slot associated with the first interface port. Similarly, data received from a second interface port of the first side is transmitted by the interface port of the second side only during a time slot associated with the second interface port. One of ordinary skill in the art would appreciate that the order of assignment and the duration of each timeslot can vary from application to application. In the upstream direction, the cross-connect receives data packets on interface port of the second side and transmits data from those packets to via the various interface ports of the first side. For example, data received from the interface port of the second side during a first time slot is transmitted via the interface port of the first side that is associated with the first time slot. Similarly, data received from the interface port of the second side during a second time slot is transmitted via the interface port of the first side that is associated with the second time slot.

Another example of a network with a cross-connect having a first side and a second side is illustrated by network 200 of FIG. 2. In network 200, the cross-connect comprises STU-C 220 coupled to STU-R 210. The first side of the cross-connect comprises interface ports 245-1 through 245-3, which are connected to communicate with downstream nodes 240-1 to 240-3 via communications links 242-1 to 242-3. The second side comprises interface port 247, which is connected to communicate with upstream node 230 via communications link 232. In the upstream direction, the cross-connect receives data on interface ports of the first side, and transmits the data via the interface port of the second side as described above. In the downstream direction, the cross-connect receives data on the interface port of the second side and transmits the data via the various interface ports of the first side as described above.

The method proceeds with detecting a fault on a first interface port of the first side (shown at block 320). There are several means known to those of skill in the art for detecting faults at an interface port. For example, a fault could be detected by sensing a bit error rate that is higher than a predetermined threshold or when signal power is outside a predetermined threshold. A fault could also be detected by receiving an AIS from an external source on a communication link.

When a fault is detected on the first interface port of the first side, the method proceeds to 330 with transmitting a signal on the second side interface port. The signal comprises a predefined framed alarm data pattern inserted into one or more time slots associated with the faulted interface port. For example, if the faulted interface port is a G.706 port, then the method inserts a framed all binary ones data pattern into the timeslots associated with the faulted interface port.

Figure 4:
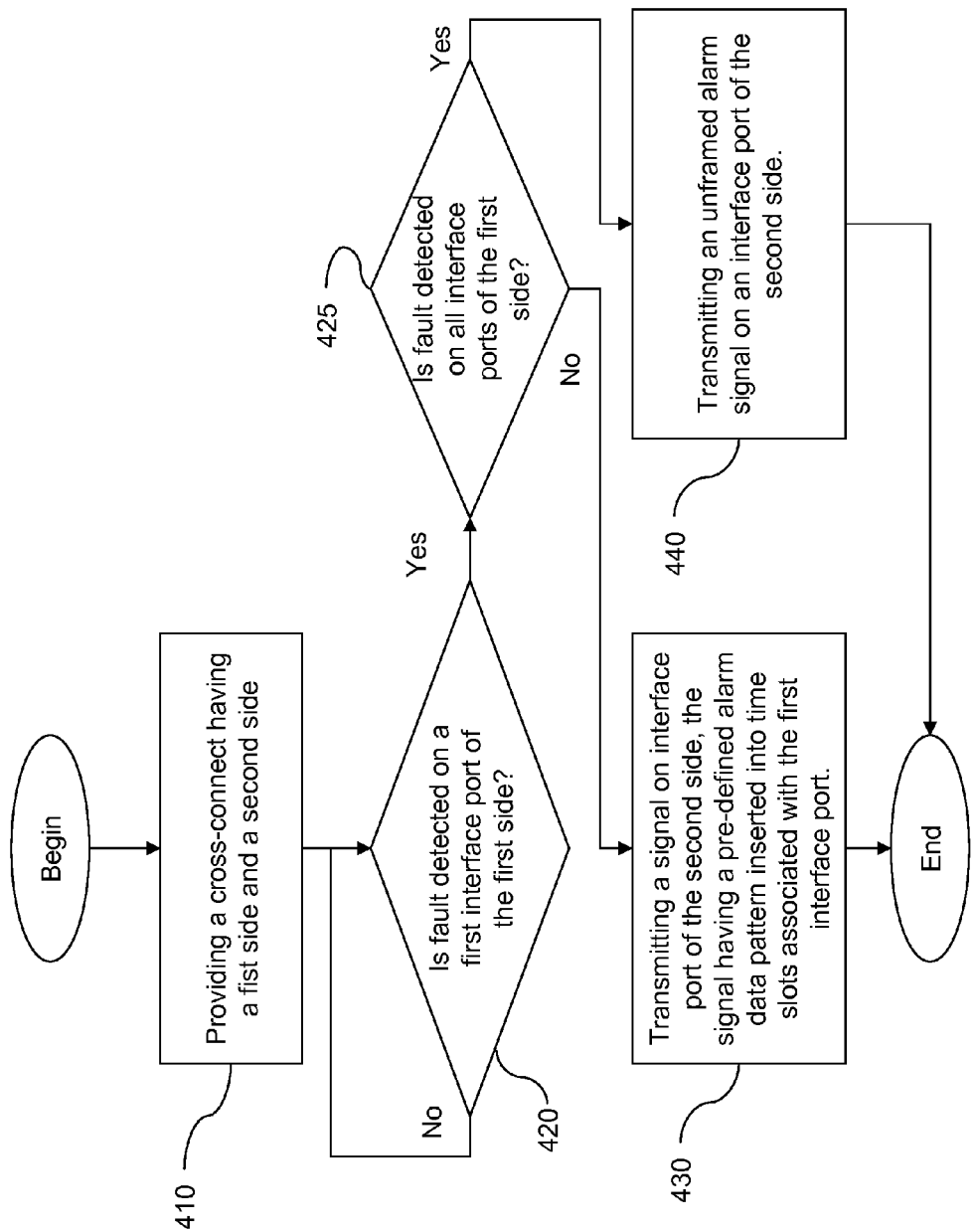
FIG. 4 is a flow chart illustrating a method of one embodiment of the present invention.

FIG. 4 is a flow chart illustrating another method of one embodiment of the present invention. The method begins at 410 with providing a network with a cross-connect having a first side and a second side, wherein the first side includes a plurality of interface ports and the second side includes a second side interface port. Examples of such a network are illustrated by network 100 of FIG. 1 and network 200 of FIG. 2, as explained with respect to FIG. 3

The method proceeds with detecting a fault on a first interface port of the first side (shown at block 420). There are several means known to those of skill in the art for detecting faults at an interface port. For example, a fault could be detected from a high bit error rate, an anomalous signal power level, a loss of signal or by detecting a loss of frame. A fault could also be detected by receiving an AIS from an external source on a communication link. The method proceeds to 425 to determine if a fault was detected on all of the interface ports of the first side. When a fault is not detected on all interface ports of the first side, but is detected on the first interface port of the first side, the method proceeds to 430 with transmitting a signal on the second side interface port. The signal comprises a pre-defined framed alarm data pattern inserted into one or more time slots associated with the faulted interface port. For example, if the faulted interface port is a G.706 port, then the method inserts a framed all binary ones data pattern into the timeslots associated with the faulted interface port.

Returning to block 425, when a fault is detected on all interface ports of the first side, the method proceeds to 440 with transmitting an unframed alarm indication signal on an interface port of the second side. The alarm indication signal used is based on the communications protocol implemented by the interface port of the second side. For example, if the interface port of the second side comprises a G.706 port, then a G.706 compliant AIS signal (that is, a pattern of unframed binary ones) is transmitted from the second side to indicate that all the interface ports of the first side are faulted. Similarly, if the interface port of the second side comprises a Nx64 port, then a Nx64 compliant AIS signal is transmitted from the second side to indicate that all the interface ports of the first side are faulted.

In one embodiment, when a fault is detected on the second side interface port, the cross-connect responds by transmitting alarm indication signals on the first side interface ports via each interface port using a protocol that supports alarm indication signals. For example, if the first side of the cross-connect includes a G.703 interface port, a Nx64 interface port, and an Ethernet interface port, when a fault is detected on the second side interface port, the cross-connect transmits a G.703 compliant AIS on the G.703 interface port and a Nx64 compliant AIS on the Nx64 interface port. No AIS is transmitted on the Ethernet port because the Ethernet protocol does not define an AIS. Thus, the cross-connect transmits an AIS on each interface port of the first side designed to transmit an AIS.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for communicating an alarm condition in a cross-connected network, the method comprising:
    providing a cross-connect having a first side and a second side, wherein the first side includes a plurality of input interface ports and the second side includes an output interface port, wherein data payloads received from each of the plurality of input interface ports of the first side are each multiplexed into respective associated timeslots allocated on the output interface port of the second side;
    detecting a fault on a first input interface port of the first side; and
    when a fault is detected on the first input interface port of the first side, but not detected on a second input interface port of the first side, transmitting a signal on the output interface port of the second side, the signal having a pre-defined alarm data pattern inserted into payload bits within one or more time slots associated with the first input interface port of the first side, wherein the signal having the pre-defined alarm data pattern is not inserted into payload bits within timeslots associated with the second input interface port of the first side.

2. The method of claim 1, wherein the pre-defined alarm data pattern is based on an alarm indication signal based on a communication protocol implemented by the first input interface port of the first side.

3. The method of claim 1, wherein the pre-defined alarm data pattern is based on one of a G.703 protocol alarm indication signal and a Nx64 protocol alarm indication signal.

4. The method of claim 1, further comprising:
    when a fault is detected on every input interface port of the plurality of input interface ports of the first side, transmitting an unframed alarm indication signal on the output interface port of the second side, wherein the alarm indication signal is based on a communication protocol implemented by the output interface port of the second side.

5. The method of claim 1, wherein detecting a fault on the first input interface port of the first side further comprises one or more of:
    receiving an alarm indication signal;
    determining a bit error rate;
    detecting a signal power level;
    detecting a loss of signal; and
    detecting a loss of frame.

6. The method of claim 1, further comprising:
    detecting a fault on the interface port of the second side; and
    when a fault is detected on the interface port of the second side, transmitting a signal on at least one interface port of the plurality of ports on the first side, the signal having a pre-defined alarm data pattern.

7. The method of claim 6, wherein transmitting a signal on at least one interface port of the plurality of ports on the first side further comprises transmitting an alarm indication signal.

8. A communication network system, the system comprising:
    a cross-connect with a first side having a plurality of input interface ports and a second side having an output interface port, wherein data payloads received from each of the plurality of input interface ports of the first side are each multiplexed into respective associated timeslots allocated on the output interface port of the second side;
    wherein the cross-connect is configured to detect when a fault occurs on at least one of the plurality of input interface ports of the first side and the interface port of the second side; and
    wherein when the cross-connect detects a fault on a first input interface port of the first side, but not a fault on a second input interface port of the first side, the cross-connect transmits a signal having a pre-defined data pattern inserted into payload bits within one or more time slots associated with the first input interface port of the first side from the output interface port of the second side, wherein the signal having the pre-defined alarm data pattern is not inserted into payload bits within timeslots associated with the second input interface port of the first side.

9. The system of claim 8, wherein when the cross-connect detects a fault on every input interface port of the first side, the cross-connect transmits an unframed alarm indication signal on the output interface port of the second side, wherein the alarm indication signal is based on a communication protocol implemented by the output interface port of the second side.

10. The system of claim 8, wherein when the cross-connect detects a fault on the interface port of the second side, the cross-connect is further adapted transmit to an alarm indication signal on one or more of the plurality of interface ports of the first side.

11. The system of claim 8 wherein each of the plurality of input interface ports of the first side is adapted to communicate data using one of a G.703 protocol, a Nx64 protocol and an Ethernet protocol.

12. The system of claim 8 wherein the output interface port of the second side is adapted to communicate data using one of a G.703 protocol, and a Nx64 protocol.

13. The system of claim 8, wherein the pre-defined data pattern is based on an alarm indication signal based on a communication protocol implemented by the first input interface port of the first side.

14. The system of claim 8, wherein the pre-defined alarm data pattern is based on one of a G.703 protocol alarm indication signal and a Nx64 protocol alarm indication signal.

15. The system of claim 8, wherein the cross-connect is adapted to detect when a fault occurs on one or more of the plurality of interface ports of the first side and the interface port of the second side based on one or more of:
   a received alarm indication signal;
   a bit error rate;
   a signal power level;
   a loss of signal; and
   a loss of frame.

16. The system of claim 8, wherein the cross-connect further comprises:
   a first transceiver coupled to the plurality of input interface ports of the first side;
   a second transceiver coupled to the output interface port of the second side; and
   a communications link coupled to the first transceiver and the second transceiver, wherein the communications link is adapted to communicate information between the first transceiver and the second transceiver; and
   wherein the second transceiver is adapted to transmit data received by the first input interface port of the first side from the output interface port of the second side during the one or more time slots associated with the first input interface port of the first side.

17. The system of claim 16, wherein the first transceiver is adapted to transmit data received during one or more time slots associated with the first interface port of the first side by the interface port of the second side from the first interface port of the first side.

18. The system of claim 16, wherein in the communications link is a digital subscriber line (DSL) communications link.

19. The system of claim 16, wherein in the first transceiver is located at a central office of a digital subscriber line (DSL) communications network.

20. The system of claim 16, wherein in the second transceiver is located at a remote unit of a digital subscriber line (DSL) communications network.

21. A system for communicating an alarm condition in a cross-connected network, the system comprising:
   means for communicating data, the means for communicating having a first side and a second side, wherein the first side includes a plurality of input interface ports and the second side includes an output interface port, wherein data payloads received from each of the plurality of input interface ports of the first side are each multiplexed into respective associated timeslots allocated on the output interface port of the second side;
   means for detecting faults on the plurality of input interface ports of the first side, the means for detecting responsive to the means for communicating data; and
   means for transmitting an alarm signal on the output interface port of the second side when a fault is detected on a first input interface port of the first side, but not detected on a second input interface port of the first side, the alarm signal having a pre-defined alarm data pattern inserted into payload bits within one or more time slots associated with the first input interface port of the first side, but not inserted into payload bits within timeslots associated with the second input interface port of the first side, the means for transmitting responsive to the means for detecting.

22. The system of claim 21, wherein the pre-defined alarm data pattern is based on an alarm indication signal based on a communication protocol implemented by the first input interface port of the first side.

23. The system of claim 21, further comprising:
   means for transmitting an unframed alarm indication signal on the output interface port of the second side when a fault is detected on every input interface port of the plurality of input interface ports of the first side, wherein the alarm indication signal is based on a communication protocol implemented by the output interface port of the second side.

24. The system of claim 21, further comprising:
   means for detecting a fault on the interface port of the second side; an means for transmitting an alarm signal on at least one interface port on the first side when a fault is detected on the interface port of the second side, wherein the alarm signal is based on a communication protocol implemented by the at least one interface port of the first side.

* * * * *